United States Patent Office 2,792,371
Patented May 14, 1957

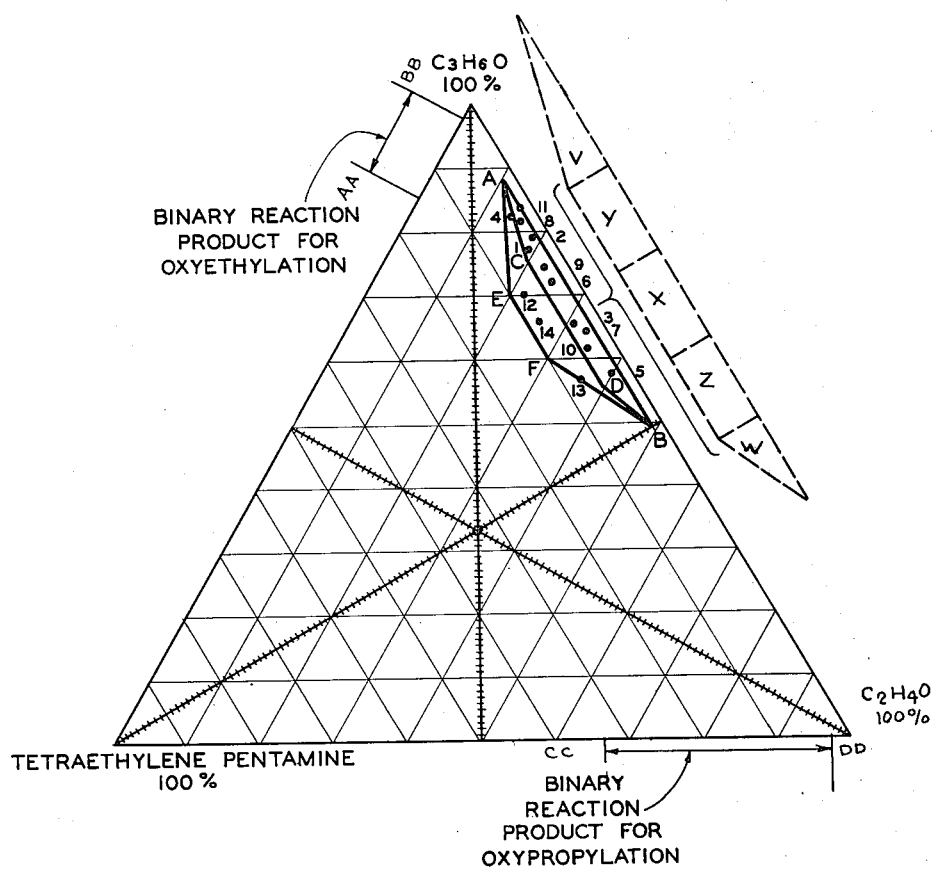

2,792,371

PROCESS FOR BREAKING PETROLEUM EMULSIONS EMPLOYING CERTAIN OXYALKYLATED TETRAETHYLENE PENTAMINES

Woodrow J. Dickson, Monterey Park, Calif., assignor to Petrolite Corporation, Wilmington, Del., a corporation of Delaware Application September 15, 1954, Serial No. 456,295

20 Claims. (Cl. 252—344)

This invention relates to processes or procedures particularly adapted for preventing, breaking or resolving emulsions of the water-in-oil type, and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipe-line oil.

More specifically then, the present invention is concerned with a process for breaking petroleum emulsions employing a demulsifier including a cogeneric mixture of a homologous series of glycol ethers of tetraethylene pentamine. The cogeneric mixture is derived exclusively from tetraethylene pentamine, propylene oxide and ethylene oxide in such weight proportions so the average composition of said cogeneric mixture stated in terms of initial reactants lies approximately within the trapezoid of the accompanying drawing in which the minimum tetraethylene pentamine content is at least 1.75% and which trapezoid is identified by the fact that its area lies within the straight lines connecting A, B, F, E. My preference by far is to use the compositions which represent less than one-half of this total area, to wit, the smaller trapezoid A, B, D, C.

It is immaterial as to whether one reacts the amine with propylene oxide first and then with ethylene oxide; or with ethylene oxide and then with propylene oxide; or, for that matter, one may employ a mixture of the two oxides, or, if desired, one may add a small amount of ethylene oxide, then propylene oxide, and then more ethylene oxide.

Referring to the hereto attached drawing it is simplified by noting that one may react tetraethylene pentamine with enough ethylene oxide so the binary reaction product falls within the mixture identified by the lines CC—DD on the extremity of the graph which shows combinations derived solely from tetraethylene pentamine and ethylene oxide. After obtaining such binary reaction product it can then be reacted with propylene oxide so as to bring it within the area of the trapezoid A, B, F, E, or preferably within the smaller trapezoid A, B, D, C.

Similarly, one can produce a binary reaction product from tetraethylene pentamine and propylene oxide as identified by the comparable line AA—BB and subject this reaction product to oxyethylation so as to bring the composition within the area of the trapezoid and preferably within the area of the small trapezoid A, B, D, C.

For the purpose of resolving petroleum emulsions of the water-in-oil type, I prefer to employ oxyalkylated derivatives, which are obtained by the use of monoepoxides, in such manner that the derivatives so obtained have sufficient hydrophile character to meet at least the test set forth in U. S. Patent No. 2,499,368, dated March 7, 1950, to De Groote and Keiser. In said patent such test for emulsification using a water-insoluble solvent, generally xylene, is described as an index of surface activity.

The above mentioned test, i. e., a conventional emulsification test, simply means that the preferred product for demulsification is soluble in a solvent having hydrophobe properties or in an oxygenated water insoluble solvent, or even in a mixture containing a fraction of a water-soluble oxygenated hydrocarbon solvent and that when shaken with water the product may remain in the nonaqueous solvent or, for that matter, it may pass into the aqueous solvent. In other words, although it is xylene soluble, for example, it may also be water soluble to an equal or greater degree.

For purpose of convenience, what is said hereinafter will be divided into three parts:

Part 1 is concerned with the oxyalkylation of tetraethylene pentamine in a general way;

Part 2 is concerned with the oxyalkylation of tetraethylene pentamine using two different oxides, i. e., propylene oxide and ethylene oxide so as to produce derivatives falling within said compositional limits as previously described and noted hereinafter in detail;

Part 3 is concerned with the resolution of petroleum emulsions of the water-in-oil type by means of the previously described chemical compounds.

PART 1

The oxyalkylation of amines is well known. This applies particularly to reactions involving monoepoxides having not over 4 carbon atoms, such as ethylene oxide and propylene oxide. As to the oxyalkylation of a monoamine such as cyclohexylamine, see U. S. Patent No. 2,626,922 dated January 27, 1953, to De Groote. As to the oxyalkylation of a polyamine, see U. S. Patents Nos. 2,552,530, 2,552,531 and 2,552,534, all dated May 15, 1951, and all to De Groote.

The oxyalkylation of an amine is comparable to other well known oxyalkylations and under certain conditions may require variation. There is no problem if the amine is a liquid or if it is xylene-soluble or soluble in an equivalent solvent, or can be melted and reacted at the melting point. In the case of tris(hydroxymethyl)-aminomethane the product is a solid and one of the most satisfactory procedures is to use a slurry of the finely powdered material in xylene comparable to the oxyalkylation of sorbitol. As to this procedure, see Example A in U. S. Patent No. 2,552,528, dated May 15, 1951, to De Groote.

In order to illustrate why the herein contemplated compounds or said products are cogeneric mixtures and not single chemical compounds, and why they must be described in terms of manufacture, and molal ratio or percentage ratio of reactants, reference is made to a monohydric alcohol. Tetraethylene pentamine has 7 reactive hydrogen atoms and thus at the beginning or early stage of oxyalkylation may have as many as 7 reactive hydrogen atoms attached to either nitrogen or oxygen. Thus, for the present purpose it may be considered the same as an amino alcohol having 7 hydroxyl radicals. However, for the moment one can forget whether the hydrogen atoms are attached to nitrogen or to oxygen and for that matter the plurality of reactive hydrogen atoms and simply consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent which, for sake of convenience, may be indicated as $RO(C_2H_4O)_{30}H$. Instead, one obtains a cogeneric mixture of closely related homologous compounds in which the formula may be shown as the following: $RO(C_2H_4O)_nH$, wherein $n$, as far as the statistical average goes is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound is of course multiplied many times in the case of a compound such as tetraethylene pentamine.

Although acid catalysts are used in oxyalkylations they are used to a lesser extent in the oxyalkylations of basic amines and the like. Under such circumstances one may have to use enough to the acidic catalyst to neutralize the basicity of the product and convert into a salt. This is not true where certain clays or prepared earths are used which act as acidic catalysts. In any event, it is our preference to use basic catalysts such as caustic soda, sodium methylate, or the like.

PART 2

The oxyalkylation of an amine, particularly a primary amine, or secondary amine or a hydroxylated amine regardless of whether it is primary, secondary, or tertiary, is comparatively simple and has been described repeatedly in the literature.

If the product is a liquid, such as triethanolamine, one can proceed to treat with an alkylene oxide such as ethylene oxide, propylene oxide, or butylene oxide, at least in the early stages if desired without adding any catalyst. Generally speaking, if oxyalkylation is rather extensive as in the present instance, one requires a catalyst after the initial stage and it is just as simple to add it from the very beginning.

The oxypropylation of a polyamine, such as tetraethylene pentamine, is comparatively simple because such products or similar products are usually liquids at ordinary temperature and invariably at oxyalkylation temperatures. Indeed, the procedure is simply to oxyalkylate without addition of any catalyst if desired and then when oxyalkylation slows up add the usual basic catalyst, such as powdered caustic soda or powdered sodium methylate. If desired, such catalyst can be added at the very beginning. It is also desirable in such cases where exhaustive oxyalkylation is concerned to add a diluent, such as xylene, high boiling petroleum solvent, or the like, at the very beginning. Such solvents usually are miscible but if not miscible one obtains a suspension or temporary emulsion and as soon as oxyalkylation has proceeded to even a slight degree the entire mass is homogeneous.

Specific reference is made to the instant application which is concerned with ethylene oxide and propylene oxide or the equivalents. Actually, whether one uses ethylene oxide or propylene oxide or, for that matter, butylene oxide, one preferably starts with a polyamine suspended in the form of a slurry, an emulsion, a suspension or as a solution. There would be a slurry in event the amine is a solid and insoluble. In the present case, however, the amine is a liquid as pointed out.

If desired, one can employ an alkylene carbonate, such as ethylene carbonate, butylene carbonate, or propylene carbonate, for the initial oxyalkylation. Where such initial oxyalkylation has gone far enough to convert the polyamine into a solvent-soluble product, i. e., soluble in xylene or an aromatic petroleum solvent, one can then use the oxides. The carbonates, of course, cost more than the oxides and there is no real advantage in most cases unless one starts with an insoluble amine such as tris(hydroxymethyl)aminomethane and this does not apply in the present case.

In any event, as is well known the oxyethylation of polyamines proceeds as readily as the oxypropylation, and this applies also to oxybutylation, particularly if the straight chain butylene oxide isomers are employed. See, for example, U. S. Patents Nos. 2,679,511, 2,679,512, 2,679,513, 2,679,514, and 2,679,515, all dated May 25, 1954, to De Groote.

It is not believed any examples are necessary to illustrate such well known procedure but for purpose of illustration the following are included:

Example 1aa

The reaction vessel employed was a stainless steel autoclave with the usual devices for heating, heat control, stirrer, inlet, outlet, etc., which is conventional in this type of apparatus. The capacity was approximately 4 liters. The stirrer was operated at a speed of approximately 250 R. P. M. There were charged into the autoclave 500 grams of tetraethylene pentamine, 300 grams of xylene, and 15 grams of sodium methylate. The autoclave was sealed, swept with nitrogen gas and stirring started immediately and heat applied. The temperature was allowed to rise to approximately 154° C. At this patricular time the addition of propylene oxide was started. Propylene oxide was added continuously at such speed that it was absorbed by the reaction as added. The amount added in this operation was 1500 grams. The time required to add the propylene oxide was 2¼ hours. During this period the temperature was maintained at 136° to 154° C., using cooling water through the inner coils when necessary and otherwise applying heat if required. The maximum pressure during the reaction was 48 pounds per square inch. Ignoring the xylene and sodium methylate and considering only tetraethylene pentamine for convenience, the resultant product represents 3 parts by weight of propylene oxide to one part by weight of tetraethylene pentamine. The xylene present represented approximately .6 part by weight.

Example 2aa

The reaction mass of Example 1aa was transferred to a larger autoclave (capacity 15 liters). Without adding any more solvent or any more xylene the procedure was repeated so as to add another 1500 grams of propylene oxide under substantially the same operating conditions but requiring about 3 hours for the addition. At the end of this step the ratio represented approximately 6 to 1 (ratio propylene oxide to tetraethylene pentamine).

*Example 3aa*

In a third step, instead of adding 1500 grams of propylene oxide to the product of Example 1aa, 1625 grams were added. The reaction slowed up and required approximately 6 hours, using the same operating temperatures and pressures. The ratio at the end of the third step was 9.25 parts by weight of propylene oxide per weight of tetraethylene pentamine.

*Example 4aa*

At the end of the third step (Example 3aa) the autoclave was opened and an additional 5 grams of sodium methylate added, the autoclave flushed out as before, and the fourth and final oxyalkylation completed, using 1625 grams of propylene oxide, and the oxyalkylation was complete within 3½ hours, using the same temperature range and pressure as previously. At the end of the reaction the product represented approximately 12.5 parts of propylene oxide by weight to one part of tetraethylene pentamine.

Having obtained oxypropylated tetraethylene pentamine the products were subjected to oxyethylation in a manner comparable to the oxyethylation of triethanolamine, or for that matter, in the same way that oxypropylated sucrose is subjected to oxyethylation in the manner described in U. S. Patent No. 2,652,394, dated September 15, 1953, to De Groote. Indeed, the procedure is comparatively simple for the reason that one is working with a liquid and also that ethylene oxide is more reactive than propylene oxide. As a result, using the same amount of catalyst one can oxyethylate more rapidly and usually at a lower pressure.

The same procedure using tetraethylene pentamine in xylene was employed in connection with ethylene oxide and the same mixture on a percentage basis was obtained as in the above examples where propylene oxide and tetraethylene pentamine were used.

In the preceding procedures one oxide has been added and then the other. One need not follow this procedure. The two oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the propylene oxide or ethylene oxide groups. In such instances the procedure again is identically the same as previously described and, as a matter of fact, I have used such methods in connection with tetraethylene pentamine.

Actually, tetraethylene pentamine at times may contain a trace of moisture. My preference is to prepare the solution with an excess of xylene and distill off a part of the xylene so as to remove any trace of water and then flush out the mass with nitrogen. Even so, there may be a few tenths of a percent of moisture remaining although at times examination indicates at the most it is merely a trace.

As previously pointed out the simplest procedure of all is to prepare a binary reaction product of tetraethylene pentamine and ethylene oxide on the one hand or tetraethylene pentamine and propylene oxide on the other hand, and react with the other oxide. Note line CC—DD which indicates that in the binary reaction product obtained from tetraethylene pentamine and ethylene oxide one employs approximately 66.6% to 96.5% of ethylene oxide and approximately 3.5% to 33.4% of tetraethylene pentamine.

Similarly, if one refers to the line AA—BB it means one would employ from 1.95% of tetraethylene pentamine up to 14.3% of tetraethylene pentamine and from 85.7% of propylene oxide up to 98.05% of propylene oxide.

In other operations I have proceeded to do as follows: Mixed the tetraethylene pentamine with an aromatic petroleum solvent and with powdered caustic soda. I have stirred this mixture at 125° to 130° C. for a short period of time, approximately one-half hour, flushed out with nitrogen, and then subjected to vacuum so as to eliminate any moisture. I then started to oxypropylate and continued until oxypropylation was complete and then immediately followed with ethylene oxide. In these examples the amount of materials used are indicated in pounds, and in each instance, of course, a suitable size autoclave was used. Although the oxyalkylation started under vacuum the maximum pressure at any time was about 10 to 15 pounds. An efficient agitating device was used and stirring speed was approximately 350 R. P. M. These data covering nine oxyalkylations are included in Table I, immediately following. The time periods are shown. Incidentally, I have repeated these same operations using ethylene oxide first and then propylene oxide and I have also mixed the two oxides and completed the same nine oxyalkylations under substantially the same conditions.

TABLE I

| Ex. No. | Tetraethylene pentamine, lbs. | High-boiling aromatic petroleum solvent, lbs. | Caustic soda, lbs. | Propylene oxide, lbs. | Ethylene oxide, lbs. | Time, hrs. | Temp. °C. | Maximum press., lbs. per sq. in. |
|---|---|---|---|---|---|---|---|---|
| 1a | 10.0 | 8.57 | 1.3 | 162.9 | 40.2 | 10.5 | 125–130 | 10–15 |
| 2a | 7.4 | 6.26 | 1.07 | 159.9 | 37.0 | 9.75 | 125–130 | 10–15 |
| 3a | 4.52 | 3.79 | .66 | 97.4 | 45.2 | 9.0 | 125–130 | 10–15 |
| 4a | 6.28 | 5.32 | 1.0 | 184.1 | 31.4 | 12.0 | 125–130 | 10–15 |
| 5a | 2.0 | 1.7 | .3 | 43.3 | 30.2 | 4:50 | 125–130 | 10–15 |
| 6a | 3.95 | 3.35 | .6 | 115.9 | 39.5 | 9:25 | 125–130 | 10–15 |
| 7a | 1.8 | 1.5 | .3 | 53.1 | 17.2 | 4:50 | 125–130 | 10–15 |
| 8a | 1.37 | 1.17 | .1 | 51.86 | 10.5 | 4:0 | 125–130 | 10–15 |
| 9a | 1.06 | .9 | .08 | 40.1 | 12.6 | 4:0 | 125–130 | 10–15 |

Referring again to the ratio of the initial reactants based on the trapezoid in attached drawing, I have calculated the percentage of the three initial reactants for the points A, B, C, D, E and F, and Nos. 1 through 14, inclusive. I have also calculated initial binary mixtures corresponding in essence to the lines CC—DD and AA—BB, all of which appears in self-explanatory form in Table II, immediately following.

TABLE II

| Points on boundary of area | Tertiary mixture, percent basis | | | Binary intermediate mixtures, percent basis | | | |
|---|---|---|---|---|---|---|---|
| | Tetraethylene pentamine | Propylene oxide | Ethylene oxide | Tetraethylene pentamine | Propylene oxide | Tetraethylene pentamine | Ethylene oxide |
| A | 1.75 | 88.25 | 10.0 | 1.95 | 98.05 | 14.90 | 85.1 |
| B | 1.75 | 50.0 | 48.25 | 3.38 | 96.62 | 3.5 | 96.5 |
| C | 5.0 | 75.0 | 20.0 | 6.24 | 93.76 | 20.0 | 80.0 |
| D | 5.0 | 55.0 | 40.0 | 8.32 | 91.68 | 11.1 | 88.9 |
| E | 10.0 | 70.0 | 20.0 | 12.5 | 87.5 | 33.4 | 66.6 |
| F | 10.0 | 60.0 | 30.0 | 14.3 | 85.7 | 25.0 | 75.0 |
| 1 | 4.72 | 76.4 | 18.88 | 5.8 | 94.2 | 20.0 | 80.0 |
| 2 | 3.62 | 78.3 | 18.15 | 4.42 | 95.58 | 13.1 | 86.9 |
| 3 | 3.07 | 66.3 | 30.63 | 4.43 | 95.57 | 9.1 | 90.9 |
| 4 | 2.84 | 83.0 | 14.16 | 3.51 | 96.49 | 16.7 | 83.3 |
| 5 | 2.66 | 57.5 | 39.84 | 4.42 | 95.58 | 6.25 | 93.75 |
| 6 | 2.48 | 72.6 | 24.92 | 3.3 | 96.7 | 9.04 | 90.96 |
| 7 | 2.21 | 64.7 | 33.09 | 3.3 | 96.7 | 6.26 | 93.74 |
| 8 | 2.16 | 81.5 | 16.54 | 2.58 | 97.42 | 11.55 | 88.45 |
| 9 | 1.97 | 74.5 | 23.53 | 2.58 | 97.42 | 7.73 | 92.27 |
| 10 | 4.0 | 61.0 | 35.0 | 6.17 | 93.83 | 10.28 | 89.72 |
| 11 | 1.8 | 83.0 | 16.0 | 2.12 | 97.88 | 10.1 | 89.9 |
| 12 | 7.0 | 70.0 | 23.0 | 9.1 | 89.9 | 23.35 | 76.65 |
| 13 | 8.0 | 57.0 | 35.0 | 12.3 | 87.7 | 18.6 | 81.4 |
| 14 | 9.0 | 65.0 | 26.0 | 12.15 | 87.85 | 25.7 | 74.3 |

As previously pointed out, the oxyalkylation of tetraethylene pentamine or similar hydroxylated polyamines has been described in the literature and is described also in detail above. All one need do is employ such conventional oxyalkylation procedure to obtain products corresponding to the compositions as defined. Attention is again directed to the fact that one need not add the entire amount of either oxide at one time but that a small portion of one could be added and then another small portion of the other, and the process repeated.

For purpose of illustration I have prepared examples in three different ways corresponding to the compositions on the drawing. In the first series propylene oxide and ethylene oxide were mixed; this series is indicated as Aa, Ba, etc., through and including 14a; in the second series propylene oxide was used first followed by ethylene oxide and this series is indicated as Ab, Bc etc., through and including 14b; and finally in a third series, ethylene oxide was used first followed by propylene oxide and this series is indicated as Ac, Bc, etc., through and including 14c. This relationship is shown in Table III.

TABLE III

| Composition corresponding to following point | Composition where oxides are mixed prior to oxyalkylation | Composition where propylene oxide used first followed by ethylene oxide | Composition where ethylene oxide used first followed by propylene oxide |
|---|---|---|---|
| A | Aa | Ab | Ac |
| B | Ba | Bb | Bc |
| C | Ca | Cb | Cc |
| D | Da | Db | Dc |
| E | Ea | Eb | Ec |
| F | Fa | Fb | Fc |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 11b | 12c |
| 13 | 13a | 13b | 13c |
| 14 | 14a | 14b | 14c |

The products obtained by the above procedure usually show some color varying from a light amber to a pale straw. They can be bleached in the usual fashion using bleaching clays, charcoal, or an organic bleach, such as peroxide or peracetic acid, or the like.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by oxide which would introduce substantially the same group along with a side chain, for instance, one could employ glycidyl methyl ether, glycidyl ethyl ether, glycidyl isopropyl ether, glycidyl butyl ether or the like.

Increased branching also may be effected by the use of an imine instead of a glycide, or a methyl glycide. Thus one can use ethylene imine, or propylene imine in the same way described for glycide or methyl glycide. An additional effect is obtained due to the basicity of the nitrogen atom. The same thing is true as far as the inclusion of nitrogen atoms if one uses a compound of the kind previously described such as a dialkylaminoepoxypropane. Excellent products are obtained by reacting tetraethylene pentamine with 1 to 7 moles of ethylene imine and then proceeding in the same manner hereidescribed.

In the hereto appended claims reference has been made to "glycol ethers of tetraethylene pentamine." Actually it well may be that the products should be referred to as "polyol ethers of tetraethylene pentamine" in order to emphasize the fact that the final products of reaction have more than two hydroxyl radicals. However, the products may be considered as hypothetically derived by reaction of tetraethylene pentamine with the glycols, such as ethylene glycol, butylene glycol, propylene glycol, or polyglycols. For this reason there seems to be a preference to use the terminology "glycol ethers of tetraethylene pentamine."

In a trapezoid such as A, B, D, C, the area can be divided conveniently into five portions by first drawing two lines from the shorter of the two parallel sides perpendicular so as to intersect the other longer parallel line in two places, thus dividing the trapezoid into two triangles and a rectangle. The rectangle then obviously can be divided into three portions of the same size by drawing two additional lines, all of which is shown in the drawing on a larger scale and in dotted lines only. In the hereto attached claims the area with the upper apex of the trapezoid refers to the area within such upper triangle; the area within the lower apex of the trapezoid refers to such lower triangle. The area in the center of the trapezoid refers to the area defined by the middle rectangle. The area of one rectangle is defined by being between the upper apex and the center rectangle, and the other by being between the lower apex and the center rectangle, all of which is perfectly plain by reference to the drawing. An attempt to draw additional lines and to number them in the same trapezoid A, B, D, C, would only tend towards confusion and thus the present means is being employed to point out the various areas which, in turn, appear in the sub-generic claims hereto appended. Thus in the drawing, the area designated V corresponds to the area within the upper triangle, the area W corresponds to the area within the lower triangle, the area X corresponds to that of the middle rectangle, and the areas Y and Z correspond to those of the other rectangles.

PART 3

As to the use of conventional demulsifying agents, reference is made to U. S. Patent No. 2,626,929, dated January 27, 1953, to De Groote, and particularly to Part 3. Everything that appears therein applies with equal force and effect to the instant process, noting only that where reference is made to Example 13b in said text beginning in column 15 and ending in column 18, reference should be to Example 5b herein described.

Having thus described my invention, what I claim as new and desire to secure by Letters Patent, is:

1. A process for breaking petroleum emulsions of the water-in-oil type characterized by subjecting the emulsion to a demulsifying agent including a cogeneric mixture of a homologous series of glycol ethers of tetraethylene pentamine; said cogeneric mixture being derived exclusively from tetraethylene pentamine, propylene oxide and ethylene oxide in such weight proportion so the average composition of said cogeneric mixture stated in terms of the initial reactants lies approximately within the trapezoid of the accompanying drawing in which the minimum tetraethylene pentamine content is at least 1.75% and which trapezoid is identified by the fact that its area lies within the straight lines A, B, F, E.

2. The process of claim 1 with the proviso that oxyalkylation takes place in presence of an alkaline catalyst.

3. The process of claim 1 with the proviso that oxyalkylation takes place in presence of an alkaline catalyst and that at least part of the propylene oxide is added first.

4. The process of claim 1 with the proviso that oxyalkylation takes place in presence of an alkaline catalyst and that all the propylene oxide is added first.

5. A process for breaking petroleum emulsions of the water-in-oil type characterized by subjecting the emulsion to a demulsifying agent including a cogeneric mixture of a homologous series of glycol ethers of tetraethylene pentamine; said cogeneric mixture being derived exclusively from tetraethylene pentamine, propylene oxide and ethylene oxide in such weight proportion so the average composition of said cogeneric mixture stated in terms of initial reactants lies approximately within the trapezoid of the accompanying drawing in which the minimum tetraethylene pentamine content is at least 1.75% and which trapezoid is identified by the fact that its area lies within the straight lines A, B, D, C; with the proviso that all the propylene oxide is added first in the presence of an alkaline catalyst.

6. The process of claim 5 with the proviso that the reactant composition approximates a point in the area corresponding with V within the upper apex of the trapezoid A, B, D, C.

7. The process of claim 5 with the proviso that the reactant composition approximates a point in the area corresponding with W within the lower apex of the trapezoid A, B, D, C.

8. The process of claim 5 with the proviso that the reactant composition approximates a point in the area corresponding with X of the central part of the trapezoid A, B, D, C.

9. The process of claim 5 with the proviso that the reactant composition approximates a point in the area corresponding with Y between the central part of the trapezoid A, B, C, D, and the upper apex.

10. The process of claim 5 with the proviso that the reactant composition approximates a point in the area corresponding with Z between the central part of the trapezoid A, B, D, C, and the lower apex.

11. A process for breaking petroleum emulsions of the water-in-oil type characterized by subjecting the emulsion to a demulsifying agent including a cogeneric mixture of a homologous series of glycol ethers of tetraethylene pentamine; said cogeneric mixture being derived exclusively from tetraethylene pentamine, propylene oxide and ethylene oxide in such weight proportion so the average composition of said cogeneric mixture stated in terms of the initial reactants lies approximately within the trapezoid of the accompanying drawing in which the minimum tetraethylene pentamine content is at least 1.75% and which trapezoid is identified by the fact that its area lies within the straight lines A, B, F, E; with the proviso that the hydrophile properties of said cogeneric mixture in an equal weight of xylene are sufficient to produce an emulsion when said xylene solution is shaken vigorously with one to three volumes of water.

12. The process of claim 11 with the proviso that oxyalkylation takes place in presence of an alkaline catalyst.

13. The process of claim 11 with the proviso that oxyalkylation takes place in presence of an alkaline catalyst and that at least part of the propylene oxide is added first.

14. The process of claim 11 with the proviso that oxyalkylation takes place in presence of an alkaline catalyst and that all the propylene oxide is added first.

15. A process for breaking petroleum emulsions of the water-in-oil type characterized by subjecting the emulsion to a demulsifying agent including a cogeneric mixture of a homologous series of glycol ethers of tetraethylene pentamine; said cogeneric mixture being derived exclusively from tetraethylene pentamine, propylene oxide and ethylene oxide in such weight proportion so the average composition of said cogeneric mixture stated in terms of initial reactants lies approximately within the trapezoid of the accompanying drawing in which the minimum tetraethylene pentamine content is at least 1.75% and which trapezoid is identified by the fact that its area lies within the straight lines A, B, D, C; with the proviso that all the propylene oxide is added first in the presence of an alkaline catalyst; with the further proviso that the hydrophile properties of said cogeneric mixture in an equal weight of xylene are sufficient to produce an emulsion when said xylene solution is shaken vigorously with one to three volumes of water.

16. The process of claim 15 with the proviso that the reactant composition approximates a point in the area corresponding with V within the upper apex of the trapezoid A, B, D, C.

17. The process of claim 15 with the proviso that the reactant composition approximates a point in the area corresponding with W within the lower apex of the trapezoid A, B, D, C.

18. The process of claim 15 with the proviso that the reactant composition approximates a point in the area corresponding with X of the central part of the trapezoid A, B, D, C.

19. The process of claim 15 with the proviso that the reactant composition approximates a point in the area corresponding with Y between the central part of the trapezoid A, B, D, C, and the upper apex.

20. The process of claim 15 with the proviso that the reactant composition approximates a point in the area correspondingly with Z between the central part of the trapezoid A, B, D, C, and the lower apex.

References Cited in the file of this patent

UNITED STATES PATENTS

| 2,457,634 | Bond et al. | Dec. 28, 1948 |
| 2,552,530 | De Groote | May 15, 1951 |
| 2,552,531 | De Groote | May 15, 1951 |
| 2,589,200 | Monson | Mar. 11, 1952 |
| 2,622,099 | Ferrero et al. | Dec. 16, 1952 |
| 2,649,483 | Huscher et al. | Aug. 18, 1953 |